(12) United States Patent
Michi et al.

(10) Patent No.: US 7,321,818 B2
(45) Date of Patent: *Jan. 22, 2008

(54) CRUISE CONTROL SYSTEM HAVING A STOP AND GO FUNCTION

(75) Inventors: Harald Michi, Oelbronn-Duerrn (DE); Hermann Winner, Bietigheim (DE); Michael Weilkes, Sachsenheim (DE); Werner Uhler, Bruchsal (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

This patent is subject to a terminal disclaimer.

(21) Appl. No.: 10/507,276

(22) PCT Filed: Oct. 1, 2002

(86) PCT No.: PCT/DE02/03713

§ 371 (c)(1),
(2), (4) Date: Mar. 10, 2005

(87) PCT Pub. No.: WO03/076226

PCT Pub. Date: Sep. 18, 2003

(65) Prior Publication Data

US 2005/0150701 A1 Jul. 14, 2005

(30) Foreign Application Priority Data

Mar. 9, 2002 (DE) .................... 102 10 547

(51) Int. Cl.
G06F 17/00 (2006.01)

(52) U.S. Cl. .................. 701/96; 701/93; 340/903; 340/435; 340/436; 180/170; 180/169; 180/171

(58) Field of Classification Search .............. 701/93, 701/96; 340/903, 435, 425.5, 436; 180/170, 180/169, 171
See application file for complete search history.

(56) References Cited

U.S. PATENT DOCUMENTS 6,226,570 B1 * 5/2001 Hahn ........................... 701/1

(Continued)

FOREIGN PATENT DOCUMENTS

DE 198 21 163 11/1999

(Continued)

OTHER PUBLICATIONS

Winner et al., *Adaptive Cruise Control Systems—Aspects and Development Trends*, SAE Technical Papers Series 961010, International Congress and Exposition, Detroit, Feb. 29-29, 1996.

Primary Examiner—Jack Keith
Assistant Examiner—Ronnie Mancho
(74) Attorney, Agent, or Firm—Kenyon & Kenyon LLP

(57) ABSTRACT

A cruise control system for motor vehicles is described, having a sensor device for measuring the vehicle's operating parameters and for measuring the distance to an object located in front of the vehicle, and having a controller for controlling the vehicle's speed or acceleration as a function of the measured operating parameters and distance data, the controller having a stop-and-go function for automatically controlling driving off, rolling, and stopping as a function of the movements of the object, and being designed for the purpose of continuously checking the sensor device during the stop-and-go operation for one or multiple predefined conditions which contradict a safe stop-and-go operation, and which, in the presence of such a condition, initiates a procedure for the shutdown of the stop-and-go function.

8 Claims, 2 Drawing Sheets

U.S. PATENT DOCUMENTS

| | | | |
|---|---|---|---|
| 6,560,525 B1 * | 5/2003 | Joyce et al. | 701/96 |
| 6,728,623 B2 * | 4/2004 | Takenaga et al. | 701/96 |
| 2002/0011924 A1 * | 1/2002 | Schwartz et al. | 340/425.5 |
| 2003/0135318 A1 * | 7/2003 | Tellis et al. | 701/96 |

FOREIGN PATENT DOCUMENTS

| | | |
|---|---|---|
| WO | 00/62139 | 10/2000 |

* cited by examiner

CRUISE CONTROL SYSTEM HAVING A STOP AND GO FUNCTION

FIELD OF THE INVENTION

The present invention relates to a cruise control system for motor vehicles, having a sensor device for measuring the vehicle's operating parameters and for measuring the distance to an object located in front of the vehicle and a controller for controlling the vehicle's speed or acceleration as a function of the measured operating parameters and distance data.

BACKGROUND INFORMATION

These types of cruise control systems make it possible to set the vehicle's speed to an intended speed selected by the driver. Since the sensor device also incorporates a distance sensor, for example in the form of a radar sensor, a stereo camera system or the like, the vehicle speed may also be set in such a way that a suitable safety distance to a vehicle ahead is automatically maintained. An example of such a control system, which is also known as an ACC (Active Cruise Control) system, is described in "Adaptive Cruise Control Systems—Aspects and Development Trends," by Winner, Witte, Uhler and Lichtenberg, Robert Bosch GmbH, in SAE Technical Papers Series 961010, International Congress and Exposition, Detroit, Feb. 26-29, 1996.

However, since the available sensor devices do not yet permit complete coverage and safe evaluation of the traffic environment, to date such systems have been primarily suitable for relatively stable traffic situations, such as driving on a highway or expressway. In urban traffic or when driving at low speeds on winding roads, however, uncertainties in detecting the particular relevant target object could create a risk of an accident. For this reason, known ACC systems are designed in such a way that they are activatable only above a certain threshold speed.

However, it has been proposed to expand the application range of the ACC system to a traffic situation described as stop-and-go, which occurs, for example, in a traffic jam or in slow-moving traffic. This traffic situation, too, is relatively stable and is therefore suitable for automatic distance control. However, the functionality must be expanded in such a way that stopping and going may also be controlled or regulated automatically.

In addition, the application range of this stop-and-go function should be limited to speeds below a certain value; the speed ranges for the ACC function and the stop-and-go function may overlap.

However, an accident risk may occur under certain circumstances, even at low speed, in the event of the driver relying on the automatic function of the cruise control system in an inappropriate situation, in particular when the driver also uses the stop-and-go function improperly in urban traffic while turning or in residential areas.

SUMMARY OF THE INVENTION

An object of the present invention is to create a cruise control system which is suited for an expanded application range taking the traffic safety requirements into account.

This object is achieved according to the present invention in that the control device has a stop-and-go function for automatically controlling driving off, rolling, and stopping as a function of the object's movements and is designed for the purpose of continuously checking the sensor device during stop-and-go operation for predefined conditions which contradict a safe stop-and-go operation, and to initiate a procedure to shut down the stop-and-go function where such a condition exists.

The present invention thus inevitably limits the application range of the stop-and-go function to traffic situations in which the function may be safely used.

Turning at a downtown intersection is a typical situation, for example, in which the driver should be prevented from using the stop-and-go function. When turning, the previously tracked target object, i.e., the vehicle which previously traveled ahead, inevitably disappears from the positioning range of the surroundings sensor, so that the cruise control system would respond with an increase in driving speed. This would create the danger of obstacles such as pedestrians or stationary or moving vehicles in the street into which the vehicle turns not being detected in time. This is the reason why, according to a preferred embodiment of the present invention, one of the conditions which trigger the shutdown of the stop-and-go function is the detection of a turn.

One criterion for detecting a turn may be the fact, for example, that the radius of a turn negotiated by the vehicle is smaller than a predefined value. Methods for measuring the turn radius are essentially known. For example, the vehicle's yaw rate may be measured using a yaw rate sensor, or the transverse acceleration may be measured using an acceleration sensor, and the turn radius may then be calculated from the measured vehicle speed and the yaw rate or the transverse acceleration. The steering angle may optionally or additionally also be evaluated. Since an intent to turn is frequently indicated by setting the turn signal, it is also possible, to increase the detecting accuracy, to evaluate the turn signal by changing the threshold value for the turn radius, for example.

The stop-and-go function should also be disabled while driving through residential areas. Although the speed limit (30 km/h) in residential areas lies in the range in which the stop-and-go function may normally also be used, unexpected situations, such as playing children, frequently have to be anticipated here, so that the driver should watch the traffic with heightened alertness and should not rely on the function of the cruise control system. As a rule, this situation differs from the regular application of the stop-and-go function due to the fact that there is no target object in the form of a vehicle traveling closely ahead. Therefore, the cruise control system will accelerate the vehicle until the intended speed set by the driver or the top limiting speed for the stop-and-go function is reached. One criterion for recognizing this situation is that the vehicle travels at the limiting speed or the intended speed for a certain length of time without a target object being detected. An alternative criterion is that the previous target object disappears and a new target object is not located within a certain time period. In this variant, the function may be shut down even before the vehicle has reached the limiting speed or the intended speed.

According to a preferred embodiment of the present invention, the procedure for shutting down the stop-and-go function may include or may start by, for example, the driver being prompted via an acoustic signal to take over control himself or, as the conditions warrant, to switch over to the ACC function. The driver may acknowledge this request by operating a switch, the accelerator pedal, or the brake, for example. This operation then automatically triggers the shutdown of the stop-and-go function and possibly the transition to the ACC function.

If the driver does not respond to the request within a certain waiting time, the shutdown may be enforced in that the vehicle speed is regulated down to a very low value, for example. This indicates to the driver that the conditions for the stop-and-go function are not being met, and the low speed also reduces endangerment of other road users to a minimum.

The forced shutdown may optionally also be implemented by braking to a standstill.

DETAILED DESCRIPTION

Figure 1:
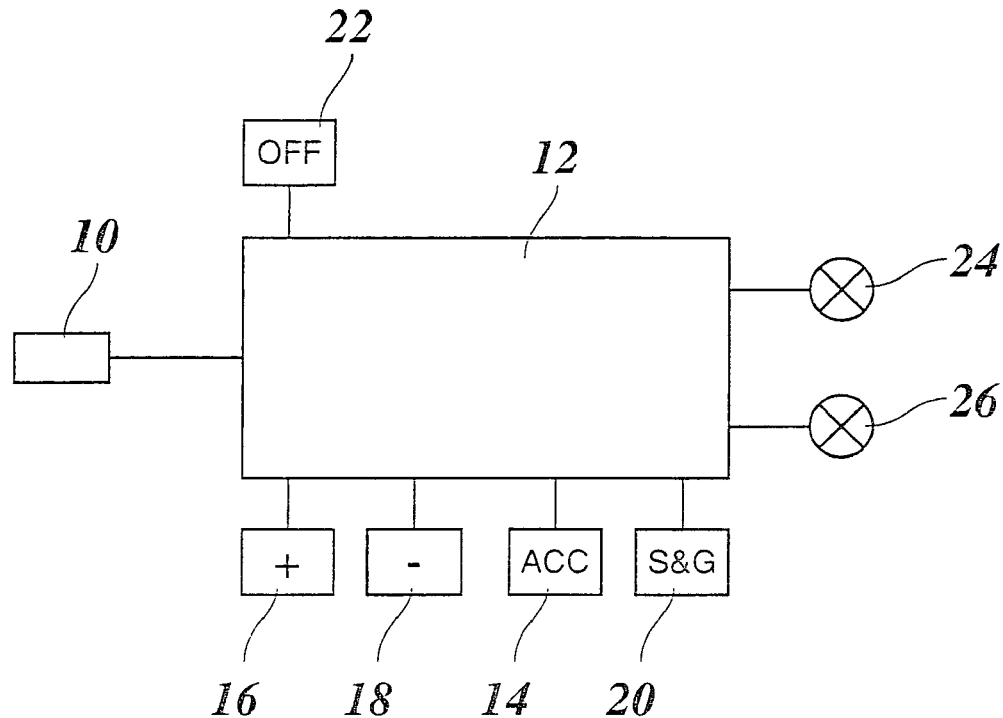
FIG. 1 shows a block diagram of the cruise control system and related operating and display elements.

Since the design and mode of operation of a cruise control system having an ACC function are known, FIG. 1 shows only the major components in a block diagram. A sensor device 10 includes at least one distance sensor, for example a radar sensor, which measures the distance to and the relative speed of a vehicle traveling ahead. If the radar sensor detects several objects, for example several vehicles or stationary targets such as road signs and the like, one target object is selected via a plausibility assessment, among other things.

Sensor device 10 also includes sensors of a known type, for example a driving speed sensor, acceleration sensors to detect both longitudinal and transverse acceleration, a yaw rate sensor and the like, which are present in the vehicle in any event and the signals of which are also used for other control purposes. The signals from the distance sensor and the other sensors are evaluated in an electronic controller 12, which, for example, is formed by a microcomputer.

Controller 12 acts on the vehicle's propulsion and braking system in order to regulate the driving speed either to an intended speed selected by the driver or to a suitable distance to the vehicle traveling ahead.

This control function, which will be referred to below as the ACC function, is activated by the driver's pressing an ACC button 14. If an intended speed has already been stored, pressing the ACC button causes control to be resumed at that intended speed ("resume"). Otherwise, the intended speed is set by the driver's briefly pressing a button 16 once the vehicle has reached the intended speed. Further pressing of button 16, or holding it, will cause the intended speed to increase progressively. Similarly, pressing a button 18 will cause the intended speed to decrease progressively.

The ACC function shuts down automatically as soon as the speed of the vehicle drops below a specified level $V_1$, for example 40 km/h. As long as the speed is less than a higher level $V_2$, for example 50 km/h, however, the driver may still activate a stop-and-go function by pressing a button 20. The driver will make use of this possibility, for example, when he is approaching a traffic jam. The stop-and-go function then causes the vehicle to be brought to a standstill automatically at a suitable distance from the end of the traffic jam. If the stopped vehicle ahead moves forward for a short distance, the stop-and-go function then causes one's own vehicle to roll automatically and move a short distance forward. In this process, the speed of one's own vehicle is limited automatically to speed $V_2$ or to a lower intended speed selected by the driver using buttons 16 and 18. It should be assumed here, however, that the intended speed cannot be selected to be lower than $V_2$.

The cruise control system may be deactivated using a button 22, regardless of whether the stop-and-go function or the ACC function is active at this time.

Figure 2:
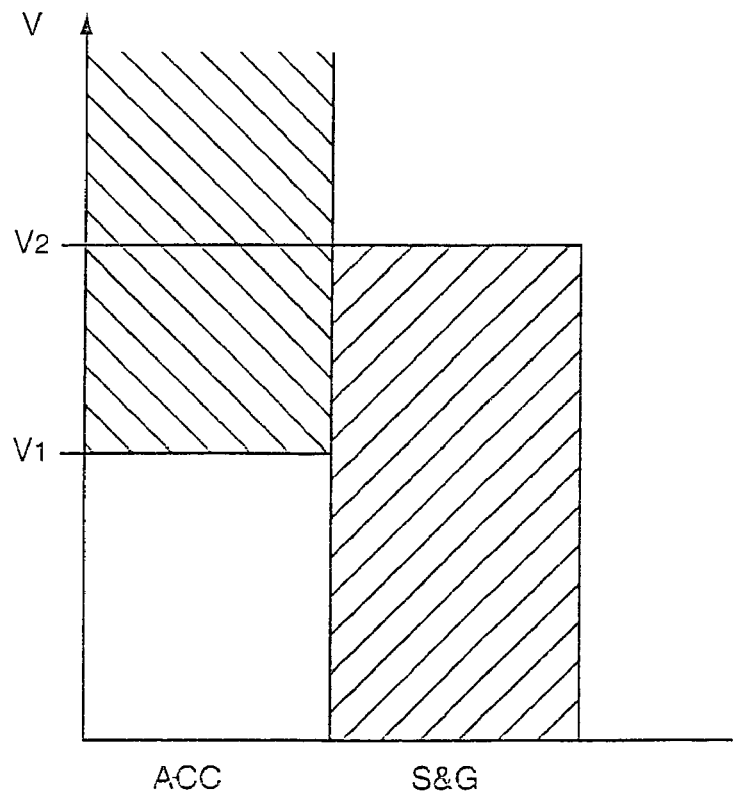
FIG. 2 shows a diagram explaining speed ranges in which various functions of the cruise control system are usable.

FIG. 2 illustrates the speed ranges in which the ACC function and the stop-and-go function may be activated. Both functions may be activated in the speed range between $V_1$ and $V_2$, however; both functions are mutually exclusive.

A lamp 24 (FIG. 1) lights up to indicate that the ACC function is active. This lamp 24 has an intermediate state between the on-state and the off-state. This intermediate state is established, for example, in that the lamp lights up less brightly, changes color, or that only a frame around the lamp lights up, indicating that the ACC function is ready for activation but not active. Similarly, if a lamp 26 lights up or assumes an intermediate state, this indicates that the stop-and-go function is active or ready for activation, respectively.

By pressing the accelerator pedal, the driver may override either the ACC function or the stop-and-go function in order to accelerate temporarily to a higher speed. In contrast, pressing the brake pedal or pressing button 22 will cause the cruise control system to be deactivated.

Figure 3:
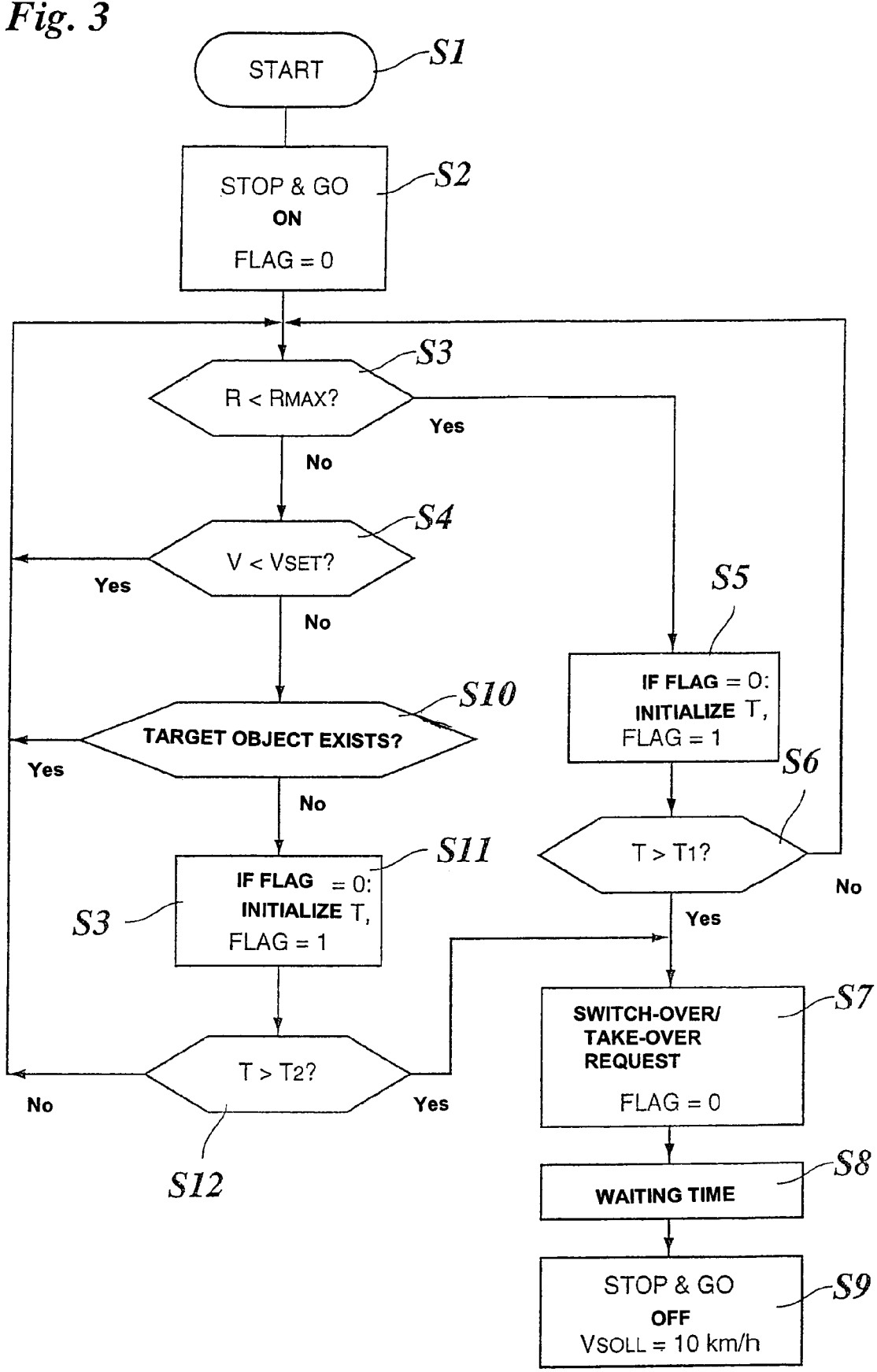
FIG. 3 shows a flow chart of a program which is implemented in the cruise control system according to the present invention.

FIG. 3 shows a flow chart of a program which is constantly run in the background by controller 12 as long as the stop-and-go function is active. This program is called (step S1) as soon as button 20 is pressed.

The stop-and-go function is activated in step S2. The program components, which, within the scope of this function, control automatic driving off, rolling, and stopping of the vehicle as a function of the measured distance to the target object, are not shown here.

In addition, a flag is set to zero in step S2.

The turn radius R of the turn negotiated by the vehicle at this very moment is calculated in step S3 based on the vehicle speed and the measured transverse acceleration of the vehicle, for example, and compared with a threshold value $R_{MAX}$. If R is greater than $R_{MAX}$, it means that the vehicle travels essentially straight ahead, i.e., no turning.

In this case, it is checked in step S4 whether the instantaneous speed V of the vehicle is lower than the intended speed $V_{SET}$ set by the driver (or $V_2$). If this condition is also met, it indicates that the vehicle speed is limited by a detected target object, i.e., there is actually a situation characterized by stop-and-go or slow-moving traffic, thus a situation in which the stop-and-go function may be used.

Under these conditions the program jumps to step S3, and the checks in steps S3 and S4 are continuously repeated.

If step S3 shows that the instantaneous turn radius R is smaller than $R_{MAX}$, the program branches to step S5. A timer T is started in step S5 and a flag is set to "1" to indicate that the timer is running. If the timer was already started in a previous cycle, which is indicated by a flag value different from zero, then there is no action taken in step S5.

It is then checked in step S6 whether the value of timer T is greater than a predefined waiting time $T_1$. If this is not the case, the program jumps back to step S3.

If, during a time interval of length $T_1$, turn radius R remained constantly smaller than $R_{MAX}$, then the conclusion was drawn that a turn was in progress. In this case, the driver is requested in step S7 to take over vehicle control himself. In addition, the flag is reset to zero.

The take-over request to the driver takes place preferably via an acoustic signal. The request may optionally or additionally also be indicated via lighting up of a signal lamp. The driver may take over control by shutting down the stop-and-go function via button 22 or by pressing the accelerator pedal. If the take-over request was issued in step S7, then, contrary to normal stop-and-go operation, pressing of the accelerator pedal causes the shutdown of the stop-and-go function, rather than automatic regulation to be overridden. As is customary, pressing of the brake pedal results in the shutdown of the stop-and-go function.

If the speed had remained lower than $V_2$, the stop-and-go function would be immediately ready for reactivation. To prevent this, the system may optionally be designed in such a way that the stop-and-go function is only ready for reactivation after a certain waiting time has elapsed. The extinction of lamp 26 indicates that the stop-and-go function is not active and is not ready to be activated.

If the driver does not respond to the take-over request within a certain waiting time (step S8), a self-shutdown of the stop-and-go function takes place in step S9 and the vehicle's speed is automatically regulated down to a very low and safe speed, 10 km/h, for example. The vehicle may optionally also be braked to a standstill. This measure makes it clear to the driver that he cannot use the stop-and-go function under these conditions, and he is prompted to respond to the take-over request.

If it is determined in step S4 that speed V of the vehicle has reached the intended speed $V_{SET}$, it is checked further in step S10 whether a target object still exists in the positioning range of the radar sensor.

The positioning range of the radar sensor, in particular the positioning depth, may vary as a function of whether the stop-and-go function or the ACC function is active. It is generally appropriate to select a greater positioning depth for the ACC function than during stop-and-go operation. The check in step S10 relates to the positioning range in effect for the stop-and-go function.

If the check shows that a target object still exists, then there is a situation which may also occur during regular stop-and-go operation, and the program jumps back to step S3. If, in contrast, no target object is detected, this indicates that there is no stop-and-go operation, and that the driver is misusing the stop-and-go function. In this case, timer T is started in step S11 and the flag is set, unless it was not already set earlier.

It is checked in step S12 whether the value of timer T is greater than a second predefined waiting time $T_2$. Waiting time $T_2$ is generally longer than waiting time $T_1$ in step S6. If waiting time $T_2$ has not yet elapsed, the program jumps back to step S3. If a new target object is subsequently detected during this waiting time, the stop-and-go function is continued in a normal manner. If, in contrast, waiting time $T_2$ elapses without a new target object being detected, this confirms the suspicion that the stop-and-go function is being misused and the program branches to the already-described step S7.

In a modified embodiment, step S4 is skipped or substituted by a check of whether the instantaneous speed is lower than $V_2$. The misuse criterion is then represented merely by the fact that no target object exists during time period $T_2$.

If, under these conditions, speed V of the vehicle is approximately equal to $V_2$ and thus higher than $V_1$, the driver also has the opportunity in this case to switch over to the ACC function by pressing button 14. This is indicated by the intermediate state of lamp 24. If the driver neither switches over to the ACC function nor takes over control, the stop-and-go function is again terminated in step S9.

It is thus ensured through the above-described measures that the stop-and-go function may only be used in traffic situations in which its use does not endanger the vehicle's passengers or other road users. The criteria for the reliability of the stop-and-go function may be modified and supplemented in various ways within the scope of the present invention. It is possible, for example, to omit steps S5 and S6, so that a turn is immediately detected if the turn radius is smaller than a suitable threshold value.

What is claimed is:

1. A cruise control system for a motor vehicle, comprising:
   a sensor device for measuring an operating parameter of the motor vehicle and for measuring a distance to an object located in front of the motor vehicle; and
   a controller for controlling one of a speed and an acceleration of the motor vehicle as a function of the measured operating parameter and the measured distance to the object, wherein:
   the controller includes a stop-and-go function for automatically controlling driving off, rolling, and stopping as a function of a movement of the object, and
   the controller continuously checks the sensor device during the stop-and-go operation for at least one predefined condition, wherein the at least one predefined condition includes a turning operation of the motor vehicle, and wherein the turning operation is detected when a turn radius is smaller than a predefined threshold value, the turn radius being determined by an evaluation of one of a yaw rate signal and a steering angle signal, and in the presence of the at least one predefined condition initiates a procedure for the shutdown of the stop-and-go function.

2. The cruise control system as recited in claim 1, wherein the turning operation is detected when the turn radius is constantly smaller than the predefined threshold value during a predefined time interval.

3. The cruise control system as recited in claim 1, wherein the at least one predefined condition further includes an instantaneous speed of the motor vehicle being essentially equal to an intended speed in effect for the stop-and-go function during a predefined time interval, and no target object being detected during the predefined time interval.

4. The cruise control system as recited in claim 1, wherein the at least one predefined condition further includes an instantaneous speed of the motor vehicle being lower than a limiting speed permitted for the stop-and-go function during a predefined time interval, and no target object being detected during the predefined time interval.

5. The cruise control system as recited in claim 1, wherein the procedure for shutdown of the stop-and-go function includes an output of a request to a driver to one of take over control of the motor vehicle and, provided a condition is met, to switch over to a regular cruise control mode and distance control mode.

6. The cruise control system as recited in claim 5, wherein the request includes an acoustic signal.

7. The cruise control system as recited in claim 1, wherein the procedure for shutdown of the stop-and-go function includes automatically regulating the speed of the motor vehicle one of down to zero and to a low speed value.

8. The cruise control system as recited in claim 5, wherein the speed is automatically regulated down after a certain waiting time subsequent to the output of the request has elapsed.

* * * * *